UNITED STATES PATENT OFFICE.

WILLIAM F. SWASEY, OF SAN FRANCISCO, CALIFORNIA.

IMPROVED CONDIMENT OR RELISH.

Specification forming part of Letters Patent No. 105,514, dated July 19, 1870.

*To all whom it may concern:*

Be it known that I, WILLIAM F. SWASEY, of the city and county of San Francisco, State of California, have invented or discovered an Improved Condiment or Relish, which I call "Bonzest;" and I do hereby declare that the following specification sufficiently sets forth the names of the ingredients used and the manner of mixing and preparing the same to make my Bonzest, that others can make and use the same without further invention or experiment.

My invention relates to an improved condiment or relish to be used as food, and which I call "Bonzest."

To make my Bonzest I take, first, green tomatoes; second, green peppers; third, horse-radish; fourth, onions, in about equal proportions, and place them in a tray or other suitable vessel and chop them quite fine with a chopping or other knife. I then add to this preparation the following seasoning ingredients: first, mustard; second, black pepper; third, Cayenne pepper; fourth, salt; fifth, ginger; sixth, sugar; seventh, vinegar; eighth, nutmegs; ninth, cloves; tenth, cinnamon; eleventh, allspice.

The quantity of each of the seasoning ingredients to be used will be regulated according to the taste or desire of the parties using.

This condiment can be put up either in cans or bottles, and kept a great length of time without deteriorating, and will provide a healthful and pleasant diet for people of all classes. Its use will be particularly beneficial at sea, where its stimulant and invigorating qualities will create an appetite where many persons would otherwise refuse food.

Having thus described my invention, what I claim, and desire to secure by Letters Patent, is—

My improved condiment called "Bonzest," composed of the ingredients enumerated, and prepared for use in a manner substantially as above set forth.

In witness that the above-described invention is claimed by me I have hereunto set my hand and seal.

WILLIAM FRANCIS SWASEY. [L. S.]

Witnesses:
    JOHN L. BOONE,
    WM. R. BOONE.